United States Patent [19]

Llewellin

[11] Patent Number: 4,635,773

[45] Date of Patent: Jan. 13, 1987

[54] NON-BACKDRIVEABLE FREE WHEELING COUPLING

[75] Inventor: William R. Llewellin, Denver, Colo.

[73] Assignee: The United States of America as represented by the Administrator of the National Aeronautics and Space Administration, Washington, D.C.

[21] Appl. No.: 725,689

[22] Filed: Apr. 22, 1985

[51] Int. Cl.$^4$ ............................................. F16D 11/04
[52] U.S. Cl. .................................... 192/46; 192/67 R
[58] Field of Search ................... 192/46, 54, 67 R, 94, 192/95; 123/185 P, 185 S; 74/531

[56] References Cited

U.S. PATENT DOCUMENTS

| 479,192 | 7/1892 | Leedle | 192/46 |
| 599,321 | 2/1898 | Doremus | 192/46 |
| 627,876 | 6/1899 | Price | 192/46 |
| 1,098,189 | 5/1914 | Stocker | 192/67 |
| 2,061,220 | 11/1936 | Cotterman | 192/46 |
| 2,413,081 | 12/1946 | Shaeffer | 192/94 |
| 3,191,732 | 6/1965 | McDowall | 192/54 |
| 3,306,406 | 2/1967 | Poliseo | 192/46 |
| 3,453,899 | 7/1969 | Tarutuni et al. | 74/531 |
| 3,721,325 | 3/1973 | Richmond | 192/67 A |
| 4,261,452 | 4/1981 | Barrows | 192/46 |
| 4,271,941 | 6/1981 | Miller | 192/46 |
| 4,353,335 | 10/1982 | Griesheimer et al. | 123/185 P |

FOREIGN PATENT DOCUMENTS 2310506 9/1973 Fed. Rep. of Germany ........ 192/46

Primary Examiner—Lawrence J. Staab
Assistant Examiner—Martin G. Belisario
Attorney, Agent, or Firm—Hardie R. Barr; John R. Manning; Marvin F. Matthews

[57] ABSTRACT

A rotary coupling for connecting a driven part to a source of rotary force transmits rotary force in one direction only and disengages to permit the driven part to free wheel when the input member is stopped and precludes the backdriving of rotary force from output member to input member. The coupling includes an input member having a splined shaft, a coupling member connected to the splined shaft, and a co-axial output member. The coupling member and the output member having complementary sets of axially facing clutch teeth. Guides in the form of helical grooves on the coupling member and spring loaded followers acting with the guides affect the engagement and disengagement of the clutch teeth by moving the coupling member toward and away from output member, the followers and guides themselves disengaging to permit free wheeling of output member when input member is stopped.

9 Claims, 4 Drawing Figures

NON-BACKDRIVEABLE FREE WHEELING COUPLING

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

Rotary force transfer devices: clutches, couplings and the like, play a major roll in our mechanized society. They are found in machinery of all levels of complexity from fishing reels to helicopter rotors and with applications which vary from door opening devices to space flight.

This invention relates to rotary force transfer couplings. More particularly, the present invention relates to such a coupling wherein the output member is enabled to free wheel relative to the input member when the input member is stopped and wherein, further, the output member is precluded from transmitting a rotary backdriving force to the input member. A Tether Return Unit utilizing this invention is useful in manned spaceflight.

During extravehicular activity by astronauts in space flight it is sometimes necessary to utilize a tether by which the astronaut is secured to the spacecraft in order to prevent too great a separation from it and which further provides a backup means for returning to the spacecraft should the astronaut's powered maneuvering unit malfunction for any reason. If a crank and reel arrangement attached to the astronaut's person is used to effect the return, it is desirable that it be of such nature that when the astronaut is moving away from the spacecraft under power (by use of a powered maneuvering unit, for example), powered rotation of the crank will be prevented so as not to injure the astronaut or cause damage to the spacesuit. It is also a desirable feature of the crank and reel arrangement that if the crank is turned backward the reel becomes disengaged so as not to uncontrollably unwind the line from the reel and thereby tangle the line.

2. Background Art

As used in this invention the term "backdriveable" means that the output member is capable of driving the input member and "non-backdriveable" means the output member is incapable of driving the input member. The term "freewheeling" means that the output member continues to turn when the input member is stopped; or that the output member can turn faster than the input member. Free wheeling couplings including input and output members and axially shifting coupling members and having clutch teeth moveable between engaged and disengaged positions as a result of the axial motions of the coupling member are known. For example, U.S. Pat. No. 3,721,325 to Richmond discloses a non-backdriveable coupling which uses a ratchet and pawl mechanism working between the coupling member and the output member and controlling the movement of the coupling member to effect engagement and disengagement of the clutch teeth. In its free wheeling mode the ratchet overruns the pawl. U.S. Pat. No. 2,061,220 to Cotterman, U.S. Pat. No. 479,192 to Leedle, U.S. Pat. No. 1,597,198 to Howell, U.S. Pat. No. 599,321 to Doremus, and U.S. Pat. No. 627,876 to Price are free wheeling clutches which differ from this invention in that they are inherently backdriveable. U.S. Pat. No. 1,098,189 to Stocker is a free wheeling clutch which differs from the present invention in that it utilizes a shifting lever to effect engagement and disengagement. None of the art discussed above teaches a non-backdriveable coupling which is also free wheeling and which, additionally, positively disengages input and output members thus eliminating continuous or intermittent drag in the free wheeling mode.

SUMMARY OF THE INVENTION

It is therefore an object of this invention to provide a non-backdriveable free wheeling coupling which permits positive disengagement of driving and driven parts thus eliminating effects of noise, wear, vibration, and drag associated with an overrunning ratchet and pawl or balls riding in grooves in the freewheeling mode. In this invention power is transmitted in one direction only, when a crank is turned forward. Turning the crank backward disengages the driving or input member from the driven or output member. Additionally, the input and output members are disengaged when the output member is turned so as to drive the input member backward. The input and output members are also disengaged permitting free wheeling of the output member when it is turning forward and the input member is stopped. Other advantages of this invention will be apparent from the descriptions which follow, in conjunction with the accompanying drawings and claims.

DETAILED DESCRIPTION OF THE PREFERRED EMBODIMENT

Figure 1:
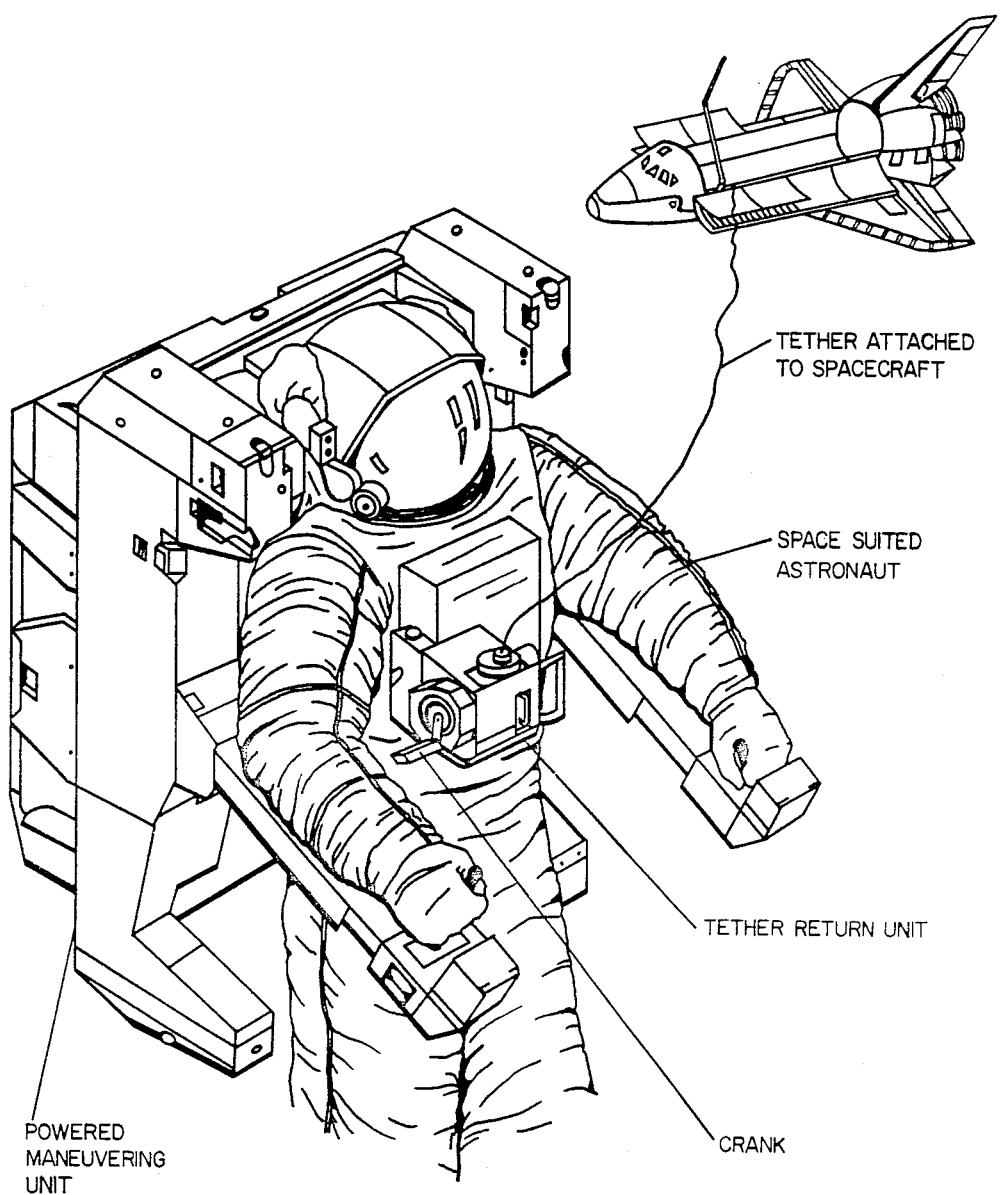
FIG. 1 is a pictorial view of a tethered astronaut, showing one application of the invention.
Figure 2:
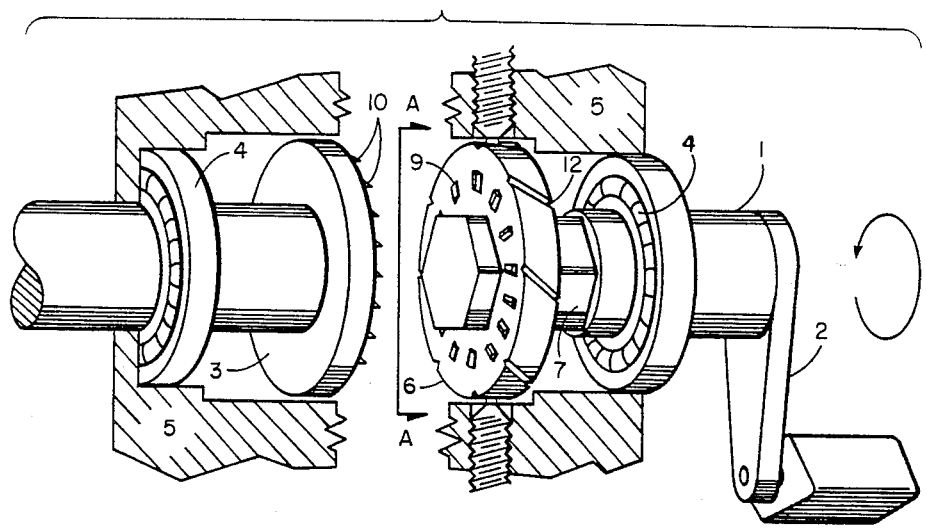
FIG. 2 is a perspective view illustrating the present invention.
Figure 3:
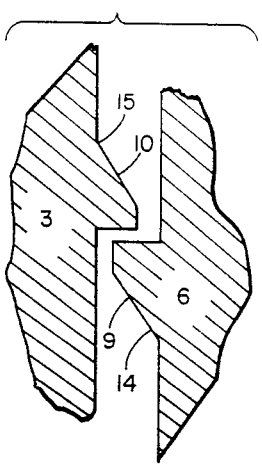
FIG. 3 is an enlarged sectional view of a representation of the clutch teeth.
Figure 4:
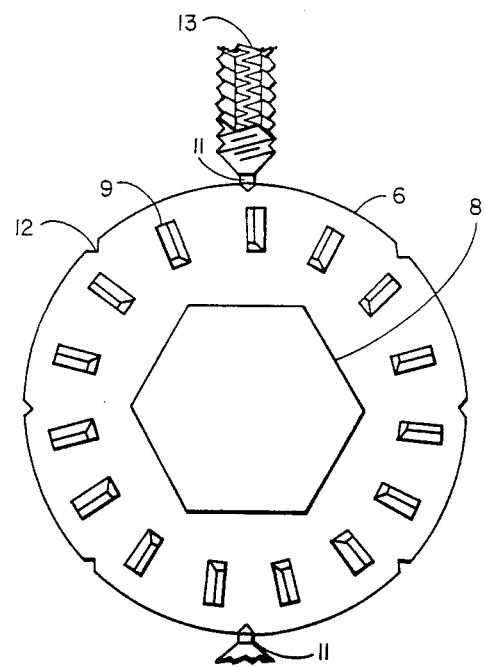
FIG. 4 is the view A—A taken from FIG. 2.

As shown in FIG. 1, the invention may be embodied in an astronaut's return line tether wherein an input member 1 is a shaft attached to a source of rotary force, such as a crank 2, which rotates the input member in one direction of rotation as shown by arrow in FIG. 2. The input member 1 and an output member 3 are supported radially by bearings 4 mounted in a housing 5.

A coupling member 6 surrounds the input member 1 and is connected thereto by means of a straight spline 7 on input member 1 and a matching inverse spline 8 in coupling member 6. The spline 7 and inverse spline 8 may have any cross sectional shape that allows the coupling member 6 to slide axially along the input member 1 without turning with respect thereto.

Rotary force transfer between the input member 1 and the output member 3 when the coupling member 6 is in the engaged position is effected by a set of clutch teeth 9 on the coupling member engaged with a complementary set of clutch teeth 10 on the output member. The two sets of clutch teeth 9, 10 are formed on adjacent ends of the coupling member 6 and output member 3 so as to axially face one another and are arranged generally concentric to the axis of rotation.

The movement of the coupling member 6 between its engaged and disengaged positions is controlled by followers 11 cooperating with guides, such as guide grooves 12, helical in form, on the outside surface of coupling member. Said guide grooves 12 are engaged by the followers 11 which are mounted in the housing 5 and are free to move radially of coupling member 6. Said followers 11 are biased, as by springs 13, so as to be urged against the guide grooves 12 of the coupling member 6.

The form of the guide grooves 12, such as helical, and their relationship to followers 11 is such that, assuming the output member 3 to be stationary, rotation of the input member 1, and consequently the coupling member, in the one direction shown by the arrow in FIG. 1 causes the coupling member to slide axially along the spline 7 of the input member toward the output member and, conversely, rotation of the input member, and coupling member in the opposite direction causes the coupling member to move away from the output member. Additionally, movement of the coupling member 6 slideably along a stationary input member 1 causes the guide grooves 12 to bear against the followers 11 and move the followers in the direction counter to that of the force exerted on them by the springs 13 and consequently to ride up and thus out of the guide grooves 12. The bias force (or force of springs 13) urging followers 11 against the guide grooves 12 is selected such that, while sufficient force is transmitted by them to overcome the mass of the coupling member 6 alone and thus move coupling member slideably along input member 1 against forces of friction therebetween, the force of the springs is ineffective to transmit sufficient force to overcome the combined mass of coupling member and input member that would be required to rotate both coupling member and input member, and if attempt is made to thus rotate coupling member and input member by way of followers acting with guides, resistance to such rotation will, instead, cause retraction of followers out of guide grooves. That is, the followers 11 acting in guide grooves 12 will inpart a sufficient component of force to slide coupling member 6 axially along input member 1. They will not transmit a component of force sufficient to rotate both coupling member 6 and input member 1.

OPERATION

FIG. 2 shows the coupling member 6 disengaged from output member 3 with all members stationary. As the input member 1 is rotated in the one direction shown by the arrow, its action on coupling member 6 by way of the spline 7 and inverse spline 8 also rotates coupling member in the same direction and at the same rotational speed. Action of the followers 11 acting in the guide grooves 12 of the rotating coupling member 6 causes coupling member to additionally move axially along input member 1 toward output member 3, bringing the two sets of clutch teeth 9, 10 on coupling member and output member respectively, into contact with one another, thus effecting their engagement and permitting the transfer of rotary power from input member to output member.

Assume now that the input member 1 is stopped while the output member 3 continues to turn. The coupling member 6 is also thereby stopped due the the action of the spline 7. The output member 3 thus begins to rotate relative to the coupling member 6. As a result of this relative rotation of coupling member 6 and output member 3, a position is reached at which the ramp faces 14, 15 of the clutch teeth 9, 10 begin exerting force on coupling member relative to output member tending to move coupling member axially away from output member and slideably along input member 1. As coupling member 6 slides axially along input member 1, such motion is resisted by the followers 11 acting in the guide grooves 12 of coupling member. Reaction of guide grooves 12 on spherical shaped surface of followers 11 is such that a component of the reactive force moves followers radially of axis of rotation against force of springs 13 until followers have retracted a distance sufficient to clear the guide grooves 12 and thus relieve forces resisting axial motion of coupling member 6 along input member 1 and away from output member 3. The coupling member 6 then so moves axially until clutch teeth 9, 10 clear each other and the output member 3 thus becomes disengaged from coupling member and is allowed to free wheel with respect to the coupling member and the input member 1.

When clutch teeth 9 of coupling member 6 and clutch teeth 10 of output member 3 are engaged but with neither being driven, assume that the output member is rotated in such direction as to tend to backdrive or transmit a rotary force through coupling member to input member 1 rotating it in the direction opposite to that shown by arrow in FIG. 2. As coupling member 6 thus begins to rotate, followers 11 acting with guide grooves 12 on coupling member exert a force on coupling member causing coupling member to move axially along the input member 1 and away from driving output member 3 until clutch teeth 9, 10 are disengaged, thus preventing backdriving of input member by output member except for the relatively small initial backward rotation while coupling member is moving a sufficient distance to disengage clutch teeth. Amount or extent of said backward rotation of coupling member 6 and input member 1 is a function of the geometry of the guide 12 and would generally be a small fraction of one revolution.

With clutch teeth 9, 10 of coupling member 6 and output member 3 engaged but device not being driven, assume that crank is turned so that input member 1 is rotated backward or in the direction opposite to the arrow shown in FIG. 1. As the input member 1 is rotated, its action on coupling member 6 by way of the spline 7 and inverse spline 8 also rotates coupling member in the same direction. Action of the followers 11 acting in the guide grooves 12 of the rotating coupling member 6 causes coupling member to move axially along input member 1 and away from output member 3 until the two sets of clutch teeth 9, 10 on coupling member and output members are no longer in contact with each other, thus also effecting disengagement of driving and driven members.

While a single embodiment of the invention has been described, variations thereof can be made without departing from the teachings of the invention. Therefore, it is intended that the scope of the invention be limited only by the claims which follow.

I claim:

1. A non-backdriveable free wheeling coupling, comprising:
   an input member rotatable about a given axis of rotation;
   a coupling member mounted on said input member by mounting means, allowing said coupling member to freely slide axially thereof and preventing relative rotation with respect to said input member;

an output member rotatable about the axis of rotation;

shifting means operably associated with said coupling member for causing axial movement of said coupling member along the axis of rotation, toward said output member when said input member is rotated in a first direction about the axis of rotation, and away from said output member when said input member is rotated in the second direction about the axis of rotation, and engagment means operably associated with said output member and said coupling member for transmitting rotary force from said coupling member to said output member when they are in axially proximal relationship.

2. A non-backdriveable free wheeling coupling as recited in claim 1, wherein said shifting means is further associated with said coupling member for moving said coupling member away from said output member when said output member is rotated in the second direction about the axis of rotation, and also when said output member is rotated in the first direction about the axis of rotation with said input member stopped.

3. A non-backdriveable free wheeling coupling as recited in claim 1 in which said input member includes a shaft having a straight spline and in which said coupling member includes a matching inverse spline.

4. A non-backdriveable free wheeling coupling as recited in claim 1 in which said engagement means includes a first set of clutch teeth on one surface of said coupling member and a complementary second set of clutch teeth on the surface of said output member axially facing said coupling member and coengageable with said first set of clutch teeth.

5. A non-backdriveable free wheeling coupling as recited in claim 1 wherein said shifting means includes a guide and a follower associated with said guide.

6. A non-backdriveable free wheeling coupling as recited in claim 5 in which said guide is a helical groove in outer surface of said coupling member.

7. A non-backdriveable free wheeling coupling as recited in claim 5 in which said follower is biased toward said guide by an adjustable force spring.

8. A non-backdriveable free wheeling coupling as recited in claim 1 wherein said shifting means further includes at least one ramp surface inclined at an angle of less than 90° with respect to a plane perpendicular to the axis of rotation on at least one of the axially facing surfaces of said output member and said coupling member, and a bearing surface projecting from the other of the axially facing surfaces of said coupling member and said output member operably associated with said ramp surface.

9. A non-backdriveable free wheeling coupling as recited in claim 8 wherein said engagement means includes a first set of clutch teeth on one surface of said coupling member and a complementary second set of clutch teeth on the surface of said output member axially facing said coupling member and coengageable with said first set of clutch teeth and wherein said ramp surface and said bearing surface are integral with said clutch teeth of said engagement means.

* * * * *